United States Patent [19]
Day et al.

[11] 3,714,939
[45] Feb. 6, 1973

[54] ANALOG SIGNAL SELECTIVE-PEAK SAMPLER SYSTEM FOR BLOOD PRESSURE SIGNALS

[75] Inventors: Christopher C. Day, Newtonville; Wesley R. Grace, Andover, both of Mass.

[73] Assignee: American Optical Corporation, Southbridge, Mass.

[22] Filed: June 1, 1970

[21] Appl. No.: 42,213

[52] U.S. Cl. ............................................128/2.05 A
[51] Int. Cl. ................................................A61b 5/02
[58] Field of Search........128/2.05 A, 2.05 D, 2.05 E, 128/2.05 M, 2.05 P, 2.05 Q, 2.05 R, 2.05 S, 2.05 T, 2.05 V, 2.06 F, 2.06 R

[56] References Cited

UNITED STATES PATENTS 2,815,748  12/1957  Boueke..............................128/2.05 T
3,174,478  3/1965  Kahn.................................128/2.06 F

OTHER PUBLICATIONS

Fiegel, Jr. "IBM Technical Disclosure Bulletin," Vol. 8, No. 6, November, 1965, p. 871.

Primary Examiner—William E. Kamm
Attorney—William C. Nealon, Noble S. Williams and Robert J. Bird

[57] ABSTRACT

A system for sampling selected peak values of an analog signal. A system is disclosed for detecting peak occurrences of a signal and for triggering a device which operates on the signal. One such device described herein is a numerical display device. The system includes means for limiting the repetition rate of peak-indicating trigger pulses to a rate between upper and lower predetermined rate-limits. The system can be used in various applications and is particularly useful in the numerical display of systolic pressure as disclosed herein. The repetition rate limits employed herein are compatible with the ability of the human eye and brain to sense and absorb visual numerical information.

14 Claims, 14 Drawing Figures

INVENTORS
CHRISTOPHER C. DAY
WESLEY R. GRACE
BY
Noble J. Williams
ATTORNEY

ANALOG SIGNAL SELECTIVE-PEAK SAMPLER SYSTEM FOR BLOOD PRESSURE SIGNALS

BACKGROUND OF THE INVENTION

1. Field of the Invention

The present invention relates to a system for sampling selected peak values of an analog signal. In general, it relates to vital-sign measuring systems and more particularly relates to a system for measuring a parameter of heartbeat activity. More specifically, the present invention relates to a device for numerically displaying values of peak pressure, termed "systolic pressure," resulting from the beating action of a person's heart.

2. Description of the Prior Art

The analog of pressure produced by beating action of a heart is normally an electrical signal with peaks and valleys. It is desirable to monitor peak values of this signal on hospitalized heart patients, since the peak values represent systolic pressure (the peak pressure produced during the contraction phase of the cardiac cycle) and provide a physician with an indication of heart pumping capability.

A typical heart-pressure analog system in the prior art includes a pressure transducer connected to a patient's heart by means of a hollow catheter. The catheter conducts the pressure to the transducer which produces an electrical signal proportional to pressure. The signal is amplified, peak detected, and fed to a DC meter.

Prior art peak detectors store peak signal voltage on a capacitor. A resistor is placed in parallel with the capacitor to permit peak voltage to decay over a period of time. At the occurrence of each successive signal peak, the capacitor is charged to that peak voltage. A DC voltage with ripple results.

A DC meter (either digital or analog) placed across the parallel combination of capacitor and resistor reads a peak DC signal having ripple. This inaccurate measurement is a problem of the prior art, particularly with digital or numerical displays.

The problem which arises in utilizing a digital meter in conjunction with a peak detector of the type previously described is due to the digital meter's capability of tracking the ripple. The digital meter has a relatively high sampling rate (in the vicinity of hundreds of samples per second) and therefore obtains samples of different values along the varying composite signal. Thus, the least significant figures of the displayed number are blurred, and in certain cases the whole number oscillates. For example, if the pressure corresponding to the peak of the signal varies between 199 and 201 pressure units, the entire number changes on the numerical display in all figures. The display is difficult, if not impossible, to read if the "flickering" is at a high rate. A solution to the flickering problem is to sample the signal only at the occurrences of the peaks of interest.

However, there are problems involved with certain prior art peak occurrence detectors. (These problems are overcome in the present invention and the solution is described herein.) For example, one problem exists when monitoring systolic peaks in a heart-pressure waveform and determining occurrences of peaks by merely differentiating the analog signal. A typical heart-pressure waveform contains a double peak. The second peak, immediately following a valley or notch in the signal known in the medical art as a "dicrotic notch", is lower in value than the systolic peak. The lower peak, known in the medical field as a dicrotic wave and termed herein as a "dicrotic notch peak" would incorrectly be detected by such a "differentiation" peak occurrence detector circuit.

The present invention is an improvement over "peak detector/digital meter" readout systems found in the prior art. The present invention incorporates a unique peak occurrence detector, (alternatively referred to herein as a peak "coincidence" detector), and is applicable to other areas of analog peak detection and measurement. However, it is particularly useful in the solution of this problem of double peak detection. The detector employs an RC bypass circuit with a discharge time constant large enough to bypass detection of the lower second peak. A pulse corresponding to the moment of systolic peak occurrence is used to trigger the numerical display device. It commands the device to sample the input analog signal and display a signal value at that time.

However, another control is required when utilizing a numerical readout device. A readout command pulse repetition rate limiter is required to make the digital display sample at a visually comfortable rate.

There is no provision described above for controlling the *rate* of readout command pulses or signals to the numerical display device. If heartbeat rate is high, the numerical display will present numerical values for visual monitoring at a high rate (equal to the rate of occurrence of systolic peaks). The rate may be too high for visual monitoring.

Thus, means for limiting the upper repetition rate or readout command pulses to a rate compatible with the ability of the human eye and brain to sense and absorb information is required. Upper repetition rate limiting means is provided in the present invention.

On the other hand, if a patient dies whereby the heartbeat rate goes to zero, a numerical display will ordinarily continue to improperly show the last detected systolic pressure value. Physicians and nurses could not conclude from the display that the patient's pressure had significantly changed. Therefore, a lower limit to the repetition rate of readout command signals is also required. In the present invention, if no systolic peaks are detected, an "artificial" triggering pulse is fed to the display device. Thus, in the event of death, the present invention provides an "artificial" readout command signal to trigger the numerical display device after a certain period of time. The device will then properly show actual pressure.

In some areas of analog peak detection, a digital computer may be incorporated. The present invention disclosed herein could be utilized with a computer and the present invention is not intended to be considered as restricted to the area of numerical display devices. It can be used with other readout and information processing devices.

SUMMARY OF THE INVENTION

An analog signal, such as that which represents pressure of a beating heart, is simultaneously applied to an input of a numerical display device, a "dicrotic notch peak" bypass, and to an input of a peak occurrence detector. The peak occurrence detector comprises an operational amplifier with negative feedback. The bypass comprises an RC network with a time constant large enough to cause the peak occurrence detector to "bypass" or not detect the dicrotic notch peak.

The analog signal is applied to a negative (inverting) input of the operational amplifier. The feedback loop comprises a resistor and a P-N junction. A capacitor is connected from the node of the resistor and P-N junction to ground. The components are arranged to provide closed loop operation for a negative going value of input analog signal. For positive going values of input analog signal the P-N junction in co-operation with stored capacitor voltage disconnect the feedback loop from the output of the amplifier and the amplifier is then in "open-loop" operation. Open loop gain of an operational amplifier is high.

The resulting large change of amplifier gain provides a step voltage output. The step voltage provides an indication of peak occurrence, (in this case the occurrence of the negative peak of the input analog signal).

The output from the peak occurrence detector is fed to a readout command signal rate limiter. The limiter comprises a unijunction relaxation oscillator having a resistor-capacitor charging network. The oscillator frequency is controlled by varying a voltage at the gate of the unijunction, (hereinafter termed "threshold voltage"), in response to pulses representing peaks of the analog signal. Thus the gate voltage of the unijunction (threshold voltage) controls the oscillator frequency. The capacitor's charging time constant is fixed.

Threshold voltage is controlled by varying a resistive voltage divider. A resistor is switched in parallel with one leg of the resistive divider. If the resistor is not switched in, threshold voltage is maximum and frequency of operation is minimum. On the other hand, if the resistor is continually connected in the circuit, then threshold level is minimum, and frequency of operation is maximum. This determines maximum and minimum rates of numeric display. Trigger pulses of maximum repetition rate do not cause nor allow the readout device to flicker too rapidly for the eye to see, and the minimum repetition rate is likewise compatible.

Thus, the numeric display device is commanded to display a value of analog input signal upon receipt of a command signal from the unijunction oscillator. It displays a value of analog signal substantially simultaneously with occurrence of a peak. In the case of heartbeat pressure, this is a value of systolic pressure. However, the systolic value is displayed at a rate which does not exceed a maximum nor fall below a minimum.

It is thus an object of the present invention to provide a new and improved system for regulating the taking of samples of an analog signal.

It is a further object of the present invention to provide new and improved apparatus for determining peak values of selected peaks of an analog signal.

It is still a further object of the present invention to provide new and improved apparatus for determining systolic pressure of a beating heart.

It is another object of the present invention to provide new and improved apparatus for numerically displaying systolic pressure of a beating heart.

Other objects and advantages of the present invention will become apparent to one having reasonable skill in the art after referring to the detailed description in conjunction with the appended drawings wherein:

DETAILED DESCRIPTION AND DESCRIPTION OF THE PREFERRED EMBODIMENT

Figures 1, 2:
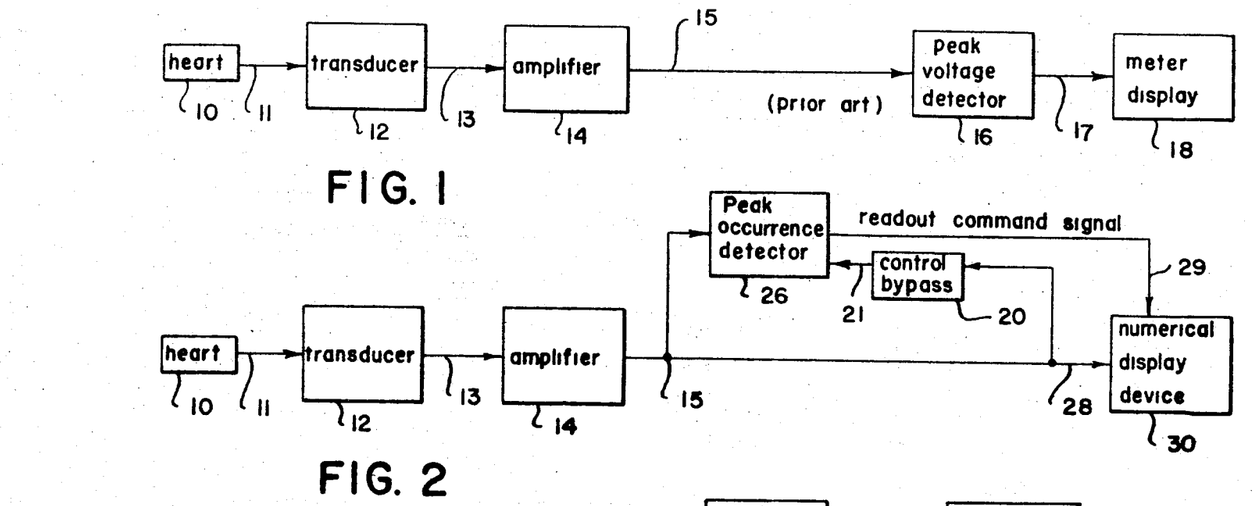
FIG. 1 is a block diagram of the prior art utilized in measuring peak values of an input analog signal.
FIG. 2 is a block diagram utilizing the peak occurrence detector, which is suitable for use where an input analog signal rate stays within certain limits.

In FIG. 1, heart 10 provides a pressure input 11 to transducer 12, which converts it to an electrical output signal on conductor 13. Amplifier 14 is fed from conductor 13 and provides an electrical output on conductor 15. Peak voltage detector 16 senses amplifier output on conductor 15 and provides a DC voltage output on conductor 17 approximately equal to peak voltage of the signal. Meter display 18 is a DC meter, either analog or digital, which indicates peak values of DC voltage on conductor 17.

Problems associated with meter flickering in FIG. 1 in response to ripple voltage, are eliminated by use of apparatus as functionally shown in FIG. 2 which depicts the same "heart-transducer-amplifier combination" as shown in FIG. 1. By comparison, however, amplifier output 15 is fed to peak occurrence detector 26, to control bypass 20, and to numerical display device 30. Device 30 displays numerical values of peak pressure.

Figure 5:
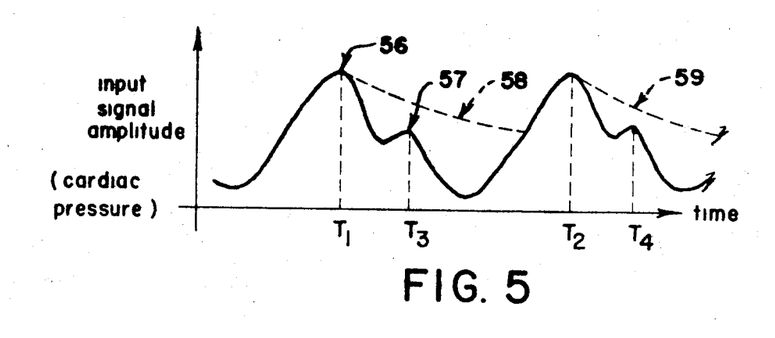
FIG. 5 is a typical waveshape of cardiac pressure versus time showing the systolic peak and the lower successive peak with the dicrotic notch therebetween and further depicting successive capacitor discharges that form predetermined decreasing amplitude profiles allowing bypass of detection of the lower successive peaks.

Peak occurrence detector 26 provides a pulse on conductor 29 substantially simultaneously with a signal peak occurrence. Since a typical cardiac waveshape is double peaked with the second peak lower than the first, (as illustrated in FIG. 5 and to be discussed later in detail), and since the systolic peak (first peak) is the peak of interest, means for preventing undesirable detection of the lower peak is provided by control bypass 20.

Control bypass 20 consists of an RC network, (capacitor 75 and resistor 76 in FIG. 4 to be discussed in detail later). Because of its sufficiently large discharge time constant bypass 20 provides a voltage on conductor 21 which is higher in value than the value of the lower peak at the occurrence of the lower peak. This voltage feeds peak occurrence detector 26 and properly inhibits detector 26 from detecting peaks that result from dicrotic notches. The operation of this bypass circuitry is described in the detail discussion of FIG. 4.

There are two inputs to numerical display device 30. One input is on conductor 28 and is analog voltage corresponding to systolic pressure. Another input on conductor 29 is a pulse corresponding in time to an occurrence of a systolic pressure peak. The pulse on conductor 29 commands numerical display device 30 to display a value of pressure corresponding to a value of voltage on conductor 28.

The configuration of FIG. 2 is appropriate to use when there is no need to control the rate at which the numerical display device displays successive systolic peaks. However, such a rate limiting control is required in digital or numerical displays and is functionally illustrated in FIG. 3.

Figure 3:
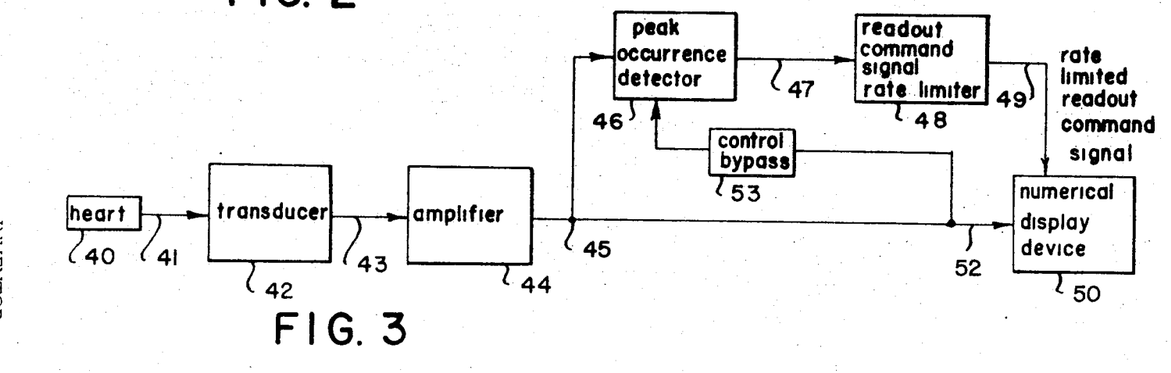
FIG. 3 is a block diagram of the present invention incorporating both peak occurrence detection and controlled-rate readout command signal processing.

In FIG. 3 heart 40 provides a pressure output 41 to transducer 42. Transducer 42 provides an electrical signal on conductor 43 which is an analog of pressure input 41. The electrical signal on conductor 43 is amplified in amplifier 44 to provide an amplified output on conductor 45. The output of amplifier 44 is fed to peak occurrence detector 46, control bypass 53, and numerical display device 50.

However, in this arrangement, peak occurrence detector 46 provides an output on conductor 47 to readout command signal rate limiter 48. Limiter 48 controls repetition rate of command pulses to numerical display device 50. Both maximum and minimum rates are established by rate limiter 48.

Thus, in FIG. 3 there are two controls. Control bypass 53 prevents peak occurrence detector 46 from detecting peaks immediately following dicrotic notches. And, readout command signal limiter 48 controls readout command pulse repetition rate within maximum and minimum rate limits.

Figure 4:
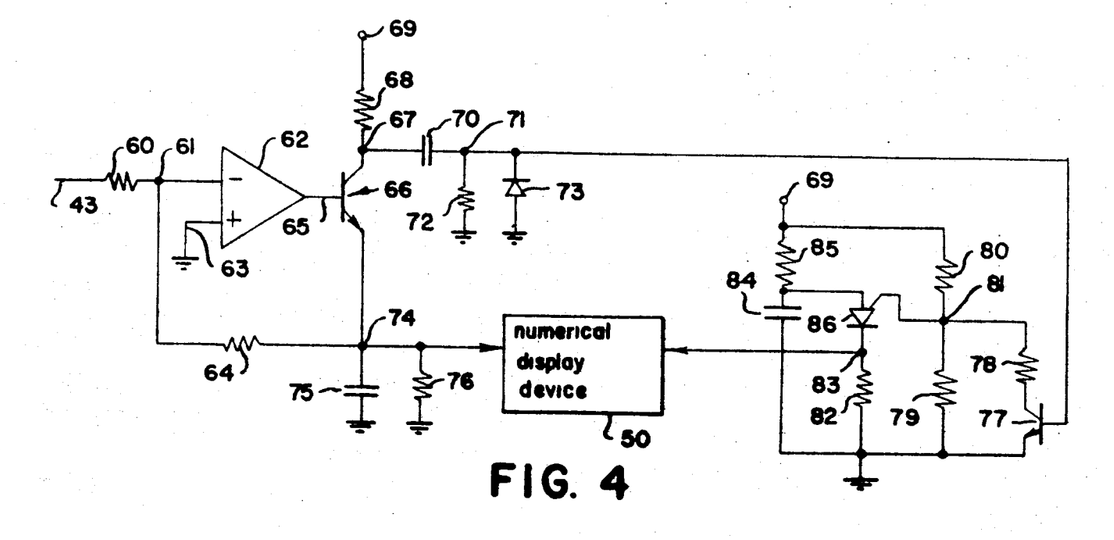
FIG. 4 is a somewhat schematic circuit diagram of the present invention showing arrangement of components within the peak occurrence detector and within the readout command signal rate limiter, and further showing their interconnection with a numerical display device.

In FIG. 4, conductor 43 conducts an analog signal of heart pressure, a typical signal waveshape being illustrated in FIG. 5. The analog signal is double peaked. Peak 56 is a systolic pressure peak, and peak 57 is a "dicrotic notch peak." Peak occurrence detector 46 provides pulse at time T1 and T2. Dashed lines 58 and 59 illustrate effect of time constants associated with controls 20 and 53 which cause the peak occurrence detector to bypass the lower peak outputs at time T3 and T4. Dashed lines 58 and 59 illustrate capacitor discharges that form successive predetermined decreasing amplitude profiles, each initiated by detection of a peak, and below which peaks are not detected.

In FIG. 4, an input signal is conducted to one end of resistor 60, the other end connected to an inverting input of amplifier 62 and to one end of resistor 64. The non-inverting input of amplifier 62 is grounded. Amplifier output 65 is conducted to the base of transistor 66. The emitter of transistor 66 is conducted to a junction 74 between capacitor 75, resistor 76, and the other end of resistor 64. Feedback means of amplifier 62 comprises the base-emitter junction of transistor 66 and resistor 64. Junction 74 is conducted to an analog voltage input terminal (not shown) of numerical display device 50.

The collector of transistor 66 is conducted to one end of resistor 68, the other end connected to a source of positive potential 69. The collector of transistor 66 is also conducted to one end of capacitor 70, the other end connected to one end of a parallel combination of resistor 72 and diode 73. The other end of this parallel combination is conducted to ground.

For a clear understanding of the circuit operation, consider the output of amplifier 62 to be as depicted in FIG. 5. This requires the input of amplifier 62 to be inverted from the representation in FIG. 5. That is, where peaks exist in FIG. 5 valleys will exist on conductor 43. An inversion like this is readily accomplished by interchanging the connections of the two leads (not shown) from transducer to amplifier. This inverted signal is applied to inverting input (−) of amplifier 62.

Consider a signal value to be approaching peak 56. Output 65 of amplifier 62 will be approaching a maximum, similar looking to that shown in FIG. 5. During this time transistor 66 is in saturation due to current flow from the output of amplifier 65 through the base-emitter junction of transistor 66 to junction 74. This current charges capacitor 75 and provides feedback current through resistor 64 to maintain amplifier 62 in a "closed-loop" mode.

Now, consider the voltage at inverting input (−) of amplifier 62 to be similar to the negative of that shown at peak point 56 of FIG. 5. Amplifier output 65 similarly is at a maximum and the emitter of transistor 66 is at a potential equal to the voltage of capacitor 75. At this point in time, the base-emitter voltage of transistor 66 becomes insufficient to maintain transistor 66 in saturation. The base-emitter junction of transistor 66 tends to disconnect node 74 from amplifier output 65. In turn, this tends to increase the feedback impedance of the amplifier. After the base-emitter junction breaks the closed loop mode of operation, and transistor 66 stops conducting, amplifier 62 operates "open-loop."

An operational amplifier such as that denoted in FIG. 4 as amplifier 62, has an extremely high gain in an open-loop mode. Any further input signal amplitude change from inverted peak point 56 along a positive slope causes voltage at junction 65 to decrease. Transistor 66 is thereby cut off since its emitter is held at the voltage of capacitor 75 momentarily.

Capacitor 75 then starts to discharge through resistor 76 along discharge paths 58 or 59 depicted in FIG. 5. It is seen that discharge path 58 bypasses peak 57 and similar bypasses occur for succeeding discharge paths and lower peaks. At time T3, output voltage of amplifier 62 (the base voltage of transistor 66), is more negative than the voltage on the emitter of transistor 66 by an amount proportional to a difference between the value of the discharge curve 58 at time T3 and the value of the lower peak 57. Transistor 66 is thereby maintained in a state of non-conduction because of the reverse bias on its base-emitter junction. Since transistor 66 does not change state, no occurrence of a peak is detected and this will be explained below. This is the operation of the control bypass circuit. Detection of the lower peak is bypassed.

Capacitor 70 in combination with resistor 72 and diode 73 comprise a differentiating circuit which passes positive going pulses and not negative going ones. Rapid increases in collector voltage at junction 67 are passed through capacitor 70 as positive going pulses. These pulses occur in time substantially simultaneously with systolic peaks, such as peak 56. These pulses are repetition rate limited by rate limiter 48.

Alternatively, a differentiating circuit which passes negative going pulses can be employed if other suitable polarity inversions are made. This type of circuit passes a pulse occurring simultaneously with the sharply negative going output of amplifier 65 at the occurrence of signal peak 56.

This is an alternative arrangement (not shown) wherein transistor 66 is removed and a diode is properly substituted for its base-emitter junction. The connection to the differentiating circuit is made from the output of amplifier 62. This arrangement has certain "switching time" advantages over the arrangement of FIG. 4 but has certain other disadvantages.

In FIG. 4, consider the remaining circuitry to be described which comprises a relaxation oscillator. Capacitor 84 is connected between ground and one end of resistor 85 the other end connected to positive voltage source 69. The junction of capacitor 84 and resistor 85 is also connected to the anode of unijunction transistor 86. The cathode of unijunction transistor 86 is connected to one end of resistor 82 the other end connected to ground. Junction 83, the junction of resistor 82 and transistor 86, is also conducted to numerical display device 50.

Resistors 79 and 80 comprise a voltage divider connected between ground and positive supply voltage 69. The junction of resistors 79 and 80 — junction 81 — is connected to the gate of transistor 86 and to one end of resistor 78. The other end of resistor 78 is connected to the collector of transistor 77, the emitter of transistor 77 being connected to ground. The base of transistor 77 is connected to junction 71 from which systolic peak coincidence pulses are received.

In operation, capacitor 84 charges through resistor 85 to a maximum voltage. A ratio of resistor 80 to a parallel combination of resistors 79 and 78 determines a maximum value to which capacitor 84 can charge.

Junction 81 is connected to the gate of unijunction transistor 86. Gate voltage controls operation of unijunction 86. For example, voltage on capacitor 84 increases toward the positive supply voltage but is stopped at a value equal to slightly more than the voltage on junction 81. When this near-equality of voltages exists, unijunction transistor 86 becomes an effective short-circuit from the junction of capacitor 84 and resistor 85 to junction 83. Capacitor 84 discharges through resistor 82. This provides a pulse at junction 83 which is conducted to a trigger input (not shown) of numerical display device 50 and is a readout command pulse.

The voltage divider, or "threshold circuit," is controllable by switching resistor 78 in response to peak coincidence pulses on the base of transistor 77. In this manner, time required for capacitor 84 to charge to a voltage of junction 81 is varied. If resistor 78 is continually in parallel with resistor 79, capacitor 84 charges to a threshold level in minimum time, providing maximum frequency. On the other hand, if resistor 78 is continually out of the circuit, capacitor 84 charges to a threshold level in maximum time, and this provides minimum frequency.

The preferred embodiment and the best mode now known for the practice of our invention comprises the following component values:

TABLE I

| | | |
|---|---|---|
| Resistors: | 60 | 100K |
| | 64 | 100K |
| | 68 | 10K |
| | 72 | 10K |
| | 76 | 100K |
| | 78 | 6.8K |
| | 79 | 20K |
| | 80 | 10K |
| | 82 | 100 Ohms |
| | 85 | 1M |
| Capacitors: | 70 | .01 μF |
| | 75 | 200 μF |
| | 84 | 3.3 μF |
| Amplifier: | 62 | μA 741 |
| Transistors: | 66 | 2N 1302 |
| | 86 | D13T1 G.E. |
| | 77 | T1S98 T.I. |
| Diode | 73 | 1N741 |

Figures 6, 7:
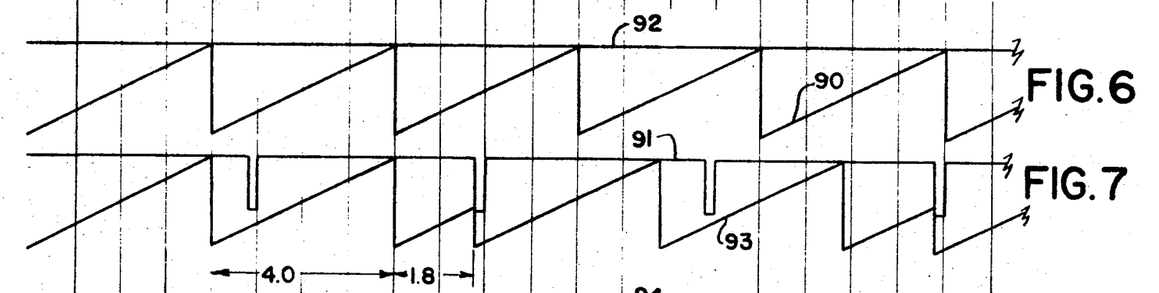
FIG. 6 is a waveshape of voltage versus time on a capacitor used in a unijunction oscillator, showing minimum frequency of oscillation.
FIG. 7 is a waveshape of voltage versus time on a capacitor used in a unijunction-oscillator, showing an effect of detection of peaks occurring at a frequency lower than that of the oscillator's minimum frequency.

In FIG. 6 waveshape 90 represents voltage on capacitor 84 charging to threshold level 92. This is a minimum frequency representation resulting from resistor 78 of FIG. 4 switched out of the circuit, corresponding to no heartbeat. Readout command pulses to display device 50 are coincident with periodic discharges occurring at each charging-voltage/threshold-level intersection.

Time between capacitor-discharges in a "no-heartbeat" situation is designed to be approximately 4 seconds. This allows a minimum pulse rate of 15 pulses per minute which is lower than any rate that is physiologically significant.

FIG. 7 is presented to give a better understanding of the operation of the read-out command signal rate limiter, within a certain repetition rate-range. This range lies between the limits of a rate greater than zero but less than 15/min. This is a physiologically improbable heartbeat rate range for a human being. But, since the invention has other areas of application, potential use of this circuitry in this repetition rate-range warrants the following explanation.

Alternate threshold variations which do not intersect waveshape 93 do not cause numerical readout device 50 to operate. Readout device 50 operates only upon the occurrence of each capacitor discharge. As shown, the capacitor is successively discharged by a low threshold alternating with high threshold 91. Time between readout command pulses alternates between approximately 1.8 seconds and exactly 4.0 seconds (within component tolerance limits).

As the input analog signal repetition rate is increased, the periods corresponding to 1.8 seconds are uniformly decreased but the time of 4.0 seconds for the alternate periods remains constant. When the shorter time periods "shrink" to zero due to an ever increasing repetition rate, the capacitor's successive discharges become "synced" with the threshold variations. When the repetition rate increases even further, one obtains a waveshape similar to FIG. 8.

Figures 8, 9:
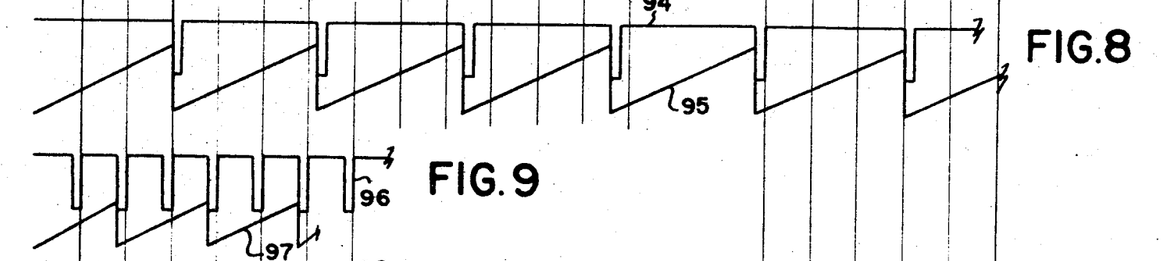
FIG. 8 is a waveshape of voltage versus time on the capacitor of the unijunction oscillator, showing the capacitor's discharges being synchronized by pulses corresponding to input analog signal peak.
FIGS. 9 and 10 are similar to FIG. 8 showing effects of peaks occurring at higher rates than the rate of FIG. 8.

In FIG. 8, voltage waveform 95 is "synced" by threshold potential 94. For this heartbeat rate, the capacitor's charging-voltage never reaches maximum threshold voltage. In this case, a patient's heart is beating at a rate greater than the lower rate limit. Every successive charging of capacitor 84 is terminated by the threshold variation at junction 81.

In FIG. 9, the heartbeat rate has tripled over that of FIG. 8, and again the capacitor's charging voltage 97 never reaches maximum threshold voltage. Waveform 97 is prevented from charging to maximum threshold by the presence of every other varying threshold 96.

It should be recalled here that the rate at which command signals are sent to display device 50 is equal to the frequency of the charging waveform. For example, time between discharges of waveform 97 is the time between command pulses. Command pulses are not sent with every variation of the threshold.

Figure 10:
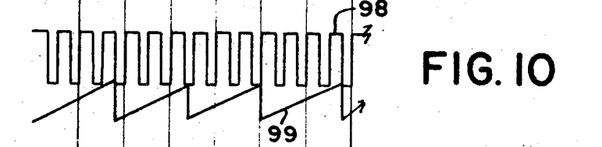

In FIG. 10 threshold 98 varies at twice the rate of variation of threshold 96. However, time between discharges of waveform 97 is not twice the time between discharges of waveform 99. One observes that the rate of command pulses to display device 50 approaches an upper limit.

Figure 11:
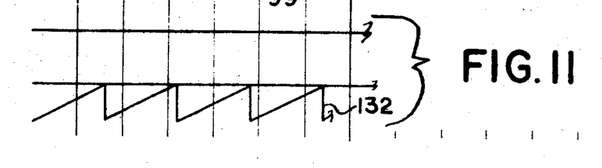
FIG. 11 is a waveshape of the oscillators capacitor's voltage versus time at the oscillator's maximum frequency of oscillation.

In FIG. 11, a maximum rate of readout command pulses is illustrated. This maximum rate would occur if resistor 78 could be permanently switched into the circuit. This maximum rate actually occurs when the threshold varies at a sufficiently high rate for the varying thresholds to "abut" each other. For example, in FIG. 9, if the varying thresholds 96 were "squeezed" together until they abutted, then the essential threshold result would be equivalent to that of FIG. 11. For purposes of clarity of illustration, FIG. 11 has not been drawn with abutting thresholds, and FIG. 11 is intended to represent this abutting threshold condition as well as the "permanently switched" condition mentioned above.

Of course, the varying thresholds are due to switching of transistor 77 in response to pulses received on its base. In reality, such pulses may not be as clearly rectangular as the varying thresholds depicted in the figures. The "abutting" of such thresholds may not be complete. A slight variation in the period from waveform to waveform may thus exist for this maximum readout command pulse rate condition.

It is seen that for these particular cases the maximum rate as determined by successive discharges of waveform 132 is approximately double the minimum rate as displayed in FIG. 6 and waveform 90. However, this rate ratio may be preset over a wide range by selection of resistors 78, 79, and 80 in FIG. 4.

Figure 12:
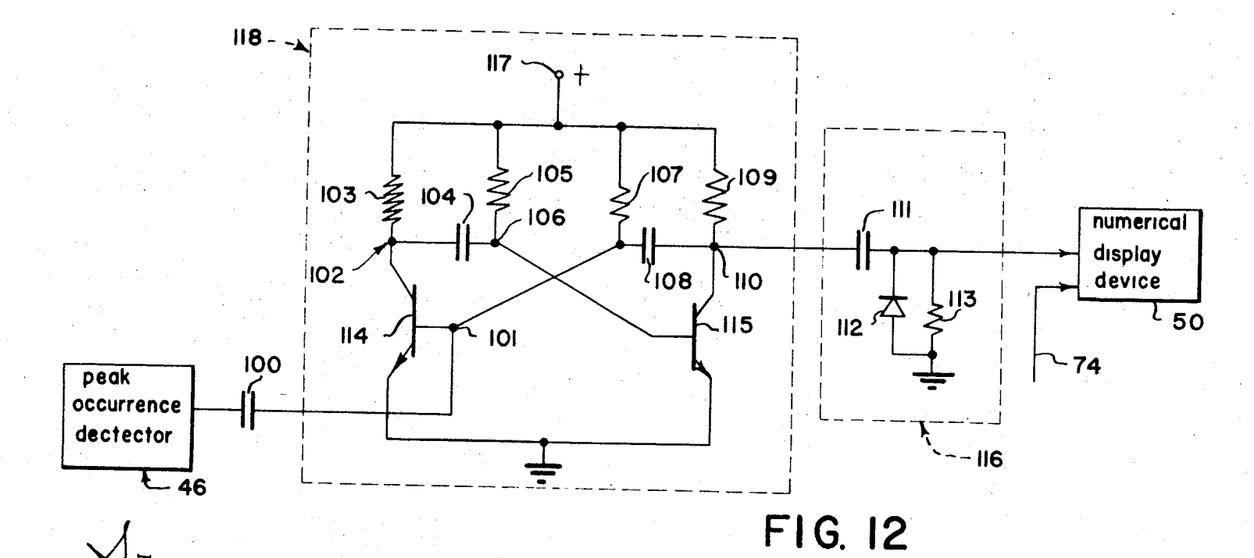
FIG. 12 is an alternative embodiment of the present invention, utilizing an astable multivibrator instead of the unijunction relaxation oscillator; and, FIGS. 13 and 14 are waveshapes associated with the alternative embodiment of the present invention.

In FIG. 12 in place of a unijunction relaxation oscillator, we substitute astable (free-running) multivibrator 118. This type of oscillator has a capability of free-running at a frequency determined by time constants of its resistors and capacitors, and has a further capability of being synchronized with input triggering pulses.

Figure 14:
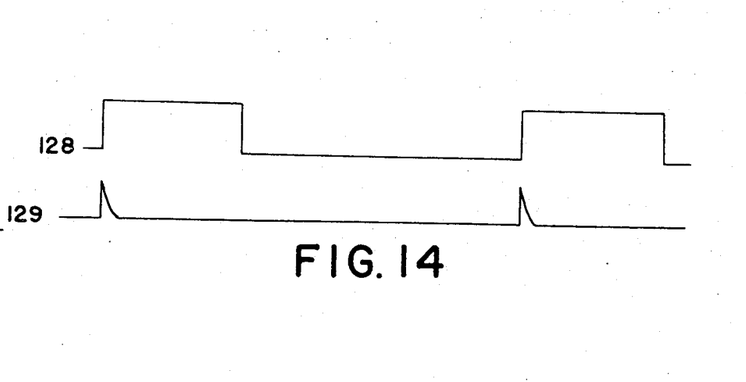

In FIG. 14, waveshape 128 is collector voltage of transistor 115 when multivibrator 118 is operating in a free-running mode. It is seen that the voltage waveform is not a square wave, but is a waveshape wherein transistor 115 is turned off for a shorter period of time than it is turned on. This asymmetry is also determined by circuit time constants.

The base of transistor 115 is connected to capacitor 104 and resistor 105 at junction 106 which provide an RC time constant associated with transistor 115. Transistor 114 has its base similarly connected to resistor 107 and capacitor 108, which also provide an RC time constant associated with transistor 114. In addition, resistor 114 has its base connected to capacitor 100, through which triggering pulses are passed from peak coincidence detector 46. Resistor 103 is a collector resistor for transistor 114 and resistor 109 is a collector resistor for transistor 115. The emitters of both transistors are connected to ground. The collector of transistor 115 provides an input to differentiating circuit 116 comprising capacitor 111, diode 112 and resistor 113.

In operation, consider transistor 114 to be turned on and transistor 115 to be turned off. Accordingly, the collector of transistor 114 is near ground potential, and capacitor 104 is being discharged through resistor 105 from a previously established capacitor voltage. Voltage at junction 106 (at this time) is lower than ground potential. This negative voltage maintains transistor 115 non-conducting. Accordingly, junction 110 is at a potential equal to that of positive supply voltage 117, and junction 101 is near ground potential because transistor 114 is in saturation. Therefore, capacitor 108 is charged to positive voltage supply 117. Resistor 107 provides base current to maintain transistor 114 in saturation.

After capacitor 104 has almost completely discharged, transistor 115 tends to turn on because of current flow from power supply 117 through resistor 105 into the base of transistor 115. Accordingly, junction 110 changes in potential from a positive supply value to near ground potential.

Capacitor 108 is charged to a potential equal to that of the supply voltage. Since it cannot instantaneously change its voltage, and since junction 110 is forced to near ground potential, the side of the capacitor connected to junction 101 is forced to a negative value of voltage equal in magnitude to approximately that of the supply.

Negative voltage at junction 101 immediately turns off transistor 114 and junction 102 jumps in voltage to the positive supply potential. Capacitor 108 will discharge through resistor 107. As depicted in FIG. 14, the time constant associated with resistor 107 and capacitor 108 is made twice as long as the time constant associated with resistor 105 and capacitor 104.

Figure 13:
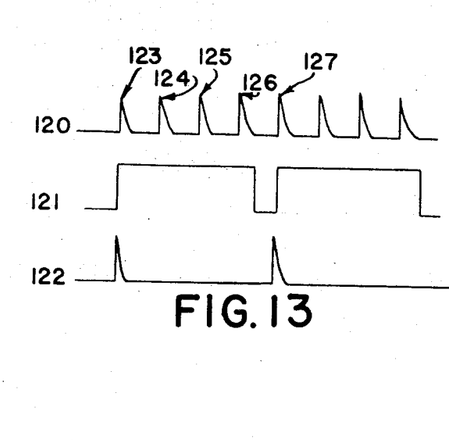

The device described free-running operation can be altered by a series of pulses applied to the base of transistor 114. In FIG. 13, consider a series of trigger pulses 120 from peak coincidence detector 46. Pulse 123 turns on transistor 114, assuming the amplitude of pulse 123 is large enough to overcome the negative voltage applied to the base by capacitor 108. This can easily be accomplished through amplification (not shown) of the trigger pulses.

Waveform 121 represents collector voltage of transistor 115, not transistor 114. It is seen that pulses 124, 125, and 126 have not substantial effect on the operation of the multivibrator. For a period of time determined by the time constant of capacitor 104 and resistor 105, transistor 115 remains non-conducting and transistor 114 remains in saturation. Since transistor 114 is turned on for this time period, pulses 124, 125, and 126 cannot make transistor 114 change state. After this time period, transistor 114 does turn off, but only momentarily because pulse 127 turns transistor 114 back on. This can be seen in FIg. 13 - waveshape 121 as a positive going step.

Recall that waveform 121 is collector voltage of transistor 115. After waveform 121 is differentiated, one obtains the pulses illustrated in waveform 122. This shows positive going spikes occurring at times equal to positive going steps of collector voltage of transistor 115. One observes that in the case illustrated there is a reduction of 4:1 between the number of pulses resulting from detection of systolic peaks and pulses applied to numerical display device 50 as readout command pulses. Thus, we obtain an upper repetition rate limit to command readout pulses.

At the other extreme, assuming there are no pulses from peak coincidence detector 46 - - (in case of death of a patient), command pulses to display device 50 will still be available because of the free-running aspect of the oscillator. In FIG. 14 one observes pulses 129 occurring with positive going edges of waveshape 128. Pulses 129 trigger display device 50 in absence of any pulses from peak coincidence detector 46. Thus, we obtain a lower repetition rate limit for the command readout pulses.

It is seen in this alternative embodiment that we perform the same function with an astable multivibrator as with a unijunction relaxation oscillator. From the two embodiments of the present invention disclosed therein, it would be understood that other changes can be made in details, arrangements of components, and components themselves without departing from the spirit and scope of the invention as defined by the appended claims.

We claim:

1. A system for repetitively sampling selected peak values of an analog signal which represents pressure in a subject's body said signal comprising a series of double peaks, the first peak of each of said double peak being a systolic peak and the second peak of each of said double peak being a lower dicrotic notch peak, said system comprising:
   an electronic measurement device;
   means for applying said signal to said device;
   detecting means responsive to said signal for detecting occurrences of said peaks, said detecting means including bypass means for bypassing detection of each said lower dicrotic notch peak, an amplifier, means for applying said signal to an input of said amplifier, and feedback means connected between input and output of said amplifier for abruptly changing gain of said amplifier in response to occurrence of peaks of said signal; and
   command means responsive to the operation of said detecting means for providing successive readout command signals to said device made to measure a value of said signal occurring substantially simultaneously with each of said command signals, said command means including limiting means for limiting the repetition rate of said command signals.

2. A system as recited in claim 1 and wherein said limiting means includes minimum limiting means for limiting the repetition rate of said readout signals to a predetermined minimum rate in response to said detecting means not detecting presence of peaks of said signal.

3. A system as recited in claim 1 and wherein said command means comprises:
   threshold means responsive to said detecting means not detecting presence of peaks of said signal for providing and maintaining a substantially constant value of threshold potential;
   oscillating means responsive to said threshold means for providing a repetitive wave having a minimum frequency in response to said constant value;
   pulse means controlled by said oscillating means for providing pulses having said minimum frequency; and,
   conducting means for conducting said pulses to said display device.

4. A system as recited in claim 1 and wherein said limiting means includes maximum limiting means for limiting the repetition rate of said readout signals to an approximate maximum rate in response to said detecting means detecting presence of peaks of said signal above a predetermined maximum rate.

5. A system as recited in claim 4 and wherein said command means comprises:
   threshold means responsive to said detecting means detecting presence of said maximum rate signal peaks for providing and maintaining a minimum average value of threshold potential;
   oscillating means for providing a repetitive wave having a maximum frequency in response to said minimum average value;
   pulse means controlled by said oscillating means for providing pulses having said maximum frequency; and
   conducting means for conducting said pulses to said display device.

6. A system as recited in claim 1 and wherein said command means further comprises:
   threshold means for providing a threshold potential;
   threshold changing means responsive to the operation of said detecting means for changing said threshold potential to a lower threshold potential;
   oscillating means for providing a repetitive wave having a variable frequency controlled by said threshold means and by said threshold changing means;
   pulse means connected to said oscillating means for providing pulses having said variable frequency; and,
   conducting means for conducting said pulses to said device.

7. A system as recited in claim 6 and wherein said threshold means comprises a voltage divider.

8. A system as recited in claim 7 and wherein said threshold changing means comprises an electronic switch, an impedance element in series connection with said switch, said switch and said element being in parallel connection with one leg of said divider, and means for operating said switch in response to said detecting means.

9. A system as recited in claim 6 and wherein said pulse means comprises resistor means for developing said pulses.

10. A system as recited in claim 1 and wherein said feedback means comprises:
- a combination of a diode in connection with a resistor one end of said combination being connected to the output of said amplifier, the other end of said combination being connected to the input of said amplifier; and
- a capacitor connected from the junction of said resistor and said diode to ground.

11. A system as recited in claim 1 and wherein said feedback means comprises:
- a transistor;
- a resistor, one end of said resistor connected to an emitter of said transistor, the base of said transistor connected to the output of said amplifier and the other end of said resistor connected to an input of said amplifier;
- a source of potential;
- a second resistor connected from the collector of said transistor to said source of potential; and
- a capacitor connected from the junction of said resistor and said emitter to ground.

12. A system as recited in claim 1 and wherein said measurement device is a numerical display device.

13. A system for repetitively sampling selected peak values of an analog signal which represents the beating action of a subject's heart, said system comprising:
- an electronic measurement device;
- means for applying said signal to said device;
- detecting means responsive to said signal for detecting occurrences of said peaks, said detecting means including means for determining certain of said peaks whose amplitudes are below a predetermined decreasing amplitude profile initiated by the detection of each of said peaks above said profile, bypass means for bypassing detection of said certain of said peaks, said bypass means including means for repetitively generating a series of thresholds, each of said thresholds decreasing from a variable high value to a variable low value in a continuous manner, each said high value coinciding with one of said peaks, means for comparing each of said peaks occurring after one of said high values with a first threshold whose high value is said one of said high values, means for ignoring said certain of said peaks having amplitude values less than the corresponding instantaneous values of said first threshold and, means for terminating said first threshold at said low value upon occurrence of a signal value greater than the corresponding instantaneous value of said first threshold; and command means responsive to the operation of said detecting means for providing successive readout command signals to said device made to measure a value of said signal occurring substantially simultaneously with each of said command signals, said command means including limiting means for limiting the repetition rate of said command signals.

14. An electronic system for regulating the taking of samples of an analog signal which represents pressure in a subject's body, said system comprising:
- operating means for sampling said signal;
- means for applying said signal to said operating means;
- detecting means for detecting occurrences of peaks of said signal, said detecting means including means for determining certain peaks of said signal having a particular characteristic, and bypass means for bypassing detection of said certain peaks of said signal, said bypass means comprising means for repetitively generating a series of thresholds, each of said thresholds decreasing from a variable high value to a variable low value in a continuous manner, each said high value coinciding with one of said peaks, means for comparing each of said peaks occurring after one of said high values with a first threshold whose high value is said one of said high values, means for ignoring said certain peaks having amplitude values less than the corresponding instantaneous values of said first threshold, and means for terminating said first threshold at said low value upon occurrence of a signal value greater than the corresponding instantaneous value of said first threshold;
- a pulse generator responsive to said detecting means for generating a series of trigger pulses, each of said trigger pulses generated at the time of occurrence of a detected peak;
- repetition rate limiting means for limiting the repetition rate of said series of pulses to a range of rates within a first predetermined minimum rate and a second predetermined maximum rate providing a limited rate trigger pulse; and,
- means for applying said limited rate trigger pulses to said operating means to cause operation of said operating means on said signal at times of occurrence of each of said limited rate pulses.

* * * * *